R. N. ALLEN.
Car-Axle.
No. 206,291. Patented July 23, 1878.
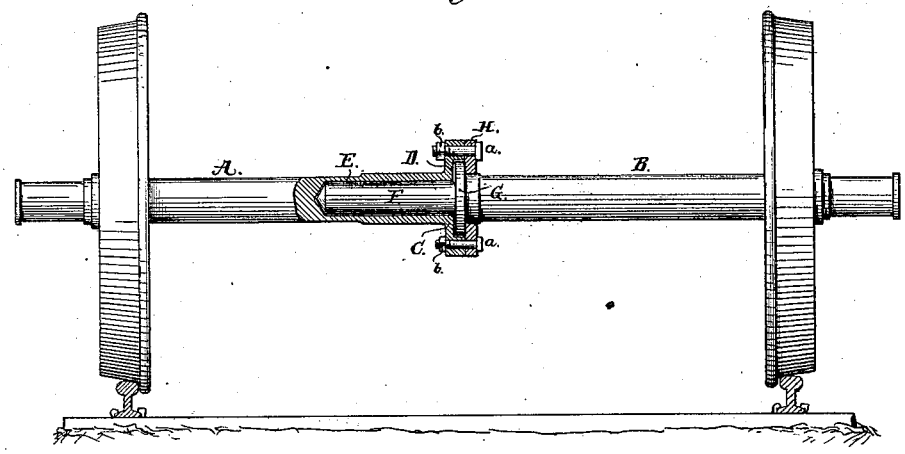
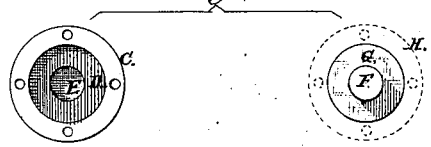
Attest,
Robt. H. Duncan
Inventor;
Richard N Allen

UNITED STATES PATENT OFFICE.

RICHARD N. ALLEN, OF HUDSON, NEW YORK, ASSIGNOR OF ONE-HALF HIS RIGHT TO JAMES C. BEACH, OF BROOMFIELD, NEW JERSEY.

IMPROVEMENT IN CAR-AXLES.

Specification forming part of Letters Patent No. 206,291, dated July 23, 1878; application filed April 19, 1878.

*To all whom it may concern:*

Be it known that I, RICHARD N. ALLEN, of Hudson, in the county of Columbia and State of New York, have invented a new and useful Improvement in Car-Axles, of which the following is a specification:

The invention relates to that class of car-axles generally known as "compound axles," which permit the wheels to revolve independently of each other, and thereby greatly diminish the friction of the wheels on the rails in passing curves, and prevent, to a great degree, the wear and tear to which both the flanges of the wheels and the edges of the rails are subjected when a single axle is used with wheels rigidly attached.

The invention consists in the peculiar formation of the joint which unites the two sections of the axle, as hereinafter fully set forth.

In the accompanying drawings, Figure 1 is a longitudinal sectional view of the axle, and Fig. 2 is a plan view of the ends of the two sections of the axle which are united to form the joint.

In the drawings, A represents one section of the axle, and B the other. The end of section A is provided with a flange, C, which is provided with a cylindrical socket or recess, D. From the bottom of this socket, and extending along the center of the axle, is a cylindrical socket, E, whose depth should be equal to the length of the journal formed on the end of section B.

It is preferred that the flange C should be forged on the end of section A, instead of being a separate piece and secured in place by shrinking or otherwise; and it is also desirable that the portion of the axle which contains the socket E should be enlarged, so as to have the same weight of metal as the same length of the solid parts of the axle.

The end of section B is formed into a journal or spindle, F, constructed to fit into the socket E in section A.

G is a circular collar formed on the axle, corresponding to the circular socket D. The face of this collar next the journal F has a broad bearing in its socket D, concentric with the journal, and this, in conjunction with the loose ring hereinafter described, which is united to the flange C and abuts against the other face of the collar G, is an important element in keeping the two sections of the axle in the same line.

H is a loose ring fitted upon the section of the axle designated by B, and capable of being brought up close against the collar G and the flange C when the journal F and the collar G are in their respective sockets. This ring and the flange C are provided with corresponding bolt-holes near their edges, and are securely locked together by means of bolts and nuts, which are designated respectively in the drawings by *a a* and *b b*.

As the ring H, located between the collar G and the wheel of the car, is securely fastened to the flange C, the two sections A and B of the axle are united, but in such manner that either of them can revolve freely and independently of the other.

Instead of the socket D being formed wholly within the flange C, it may be formed partly within this flange and partly within the loose ring H, or it may be wholly within the ring H.

It is, however, important to this construction that one face of the collar G have a bearing on or in the ring H, and also that its other face have a bearing on or in the flange; and, also, that the socket D be so located that when the collar G is in place some part of it will be substantially in the plane of the union of the face of the flange C and the face of the ring H.

What is claimed as new is—

The joint of a compound car-axle, consisting of a flange provided with a cylindrical socket connecting with a second cylindrical socket of less diameter in one section of the axle, in combination with a circular collar, a journal, and loose ring on the other section, the collar or some part thereof being in the same plane with the face of the flange, and the ring and the flange being secured together, substantially as and for the purpose set forth.

RICHARD N. ALLEN.

Witnesses:
J. C. LEECH,
ROBT. H. DUNCAN.